United States Patent [19]

Lee

[11] Patent Number: 5,026,268

[45] Date of Patent: Jun. 25, 1991

[54] APPARATUS FOR BLOW MOLDING AN ARTICLE WITH COMPRESSION MOLDED AREAS

[75] Inventor: Norman C. Lee, Greensboro, N.C.

[73] Assignee: Zarn, Inc., Reidsville, N.C.

[21] Appl. No.: 502,317

[22] Filed: Mar. 30, 1990

[51] Int. Cl.[5] ............................................. B29C 49/30
[52] U.S. Cl. .................................. 425/525; 425/450.1;
425/541
[58] Field of Search ..................... 425/522, 525, 450.1,
425/541; 264/531, 533, 534

[56] References Cited

U.S. PATENT DOCUMENTS

| | | | |
|---|---|---|---|
| D. 298,303 | 11/1988 | Lee | D11/152 |
| 3,342,916 | 9/1967 | Peters | 264/536 |
| 3,424,829 | 1/1969 | Peters et al. | 264/529 |
| 3,438,538 | 4/1969 | Peters | 220/288 |
| 3,585,681 | 6/1971 | Branscum et al. | 425/150 |
| 3,711,233 | 1/1973 | Uhlig | 425/525 |
| 3,792,143 | 2/1974 | Branscum et al. | 264/296 X |
| 3,986,805 | 10/1976 | Haines | 425/450.1 X |
| 4,170,623 | 10/1979 | Dubois et al. | 264/534 |
| 4,409,176 | 10/1983 | Jakobsen et al. | 425/525 X |
| 4,715,144 | 12/1987 | Lee | 47/66 |
| 4,938,680 | 7/1990 | Guarriello et al. | 425/522 |

OTHER PUBLICATIONS

Peters, D. L.; "Blow Molding Highly Irregular Shaped Parts with Moving Mold Sections," undated, Phillips Chemical Company, Plastics Technical Center, Bartlesville, Okla.

Peters, D. L.; Campbell, P. E.; and Morgan, B. T., Reprint of article from "Plastics in a World Economy", undated, titled "High Molecular Weight High Density Polyethylene Powder for Extrusion Blow Molding of Drums and Other Large Parts".

Primary Examiner—Richard L. Chiesa
Attorney, Agent, or Firm—Shefte, Pinckney & Sawyer

[57] ABSTRACT

Blow molding apparatus for producing an article including compression rings or other compression molded areas utilizes mold halves each having multiple mold sections connected in end-to-end relation by a series of guide rods having end stops to permit limited movement of the mold sections toward and away from one another. With the present control rod arrangement, only a single actuating arrangement is necessary to accomplish the formation of multiple compression molded areas.

10 Claims, 8 Drawing Sheets

APPARATUS FOR BLOW MOLDING AN ARTICLE WITH COMPRESSION MOLDED AREAS

BACKGROUND OF THE INVENTION

The present invention relates generally to blow molding apparatus of the type having movable mold sections for forming compression molded areas in a molded article and, more particularly, to blow molding apparatus of this type adapted for molding annular compression rings in a molded article.

Blow molding of thermoplastic material is a common and well known technique for forming hollow plastic bodies basically by extruding and inflating a tubular plastic parison within a mold cavity defined between mating mold halves movable toward and away from one another in a direction radially with respect to the parison to open and close the mold cavity. It is further known to provide one of the mold halves with auxiliary mold sections which are movable with respect to one another to form a compression molded area in the parison, e.g., for forming a handle opening in the molded article. Representative examples of this type of blow molding apparatus are disclosed in U.S. Pat. Nos. 3,342,916; 3,424,829; 3,438,538; 3,585,681; and 3,792,143. Other blow molding apparatus are known wherein each mold half is provided with two or more mold sections arranged for movement in a direction axially with respect to the tubular parison following initial inflation thereof within the mold to produce annular compression rings about the exterior periphery of the molded article, for example, to facilitate lifting and handling thereof. U.S. Pat. No. 4,170,623, discloses a representative example of blow molding apparatus of this type.

SUMMARY OF THE INVENTION

It is an object of the present invention to provide an improved blow molding apparatus suitable for forming two or more compression molded areas, particularly annular compression rings, at longitudinal spacings along a molded article. It is a further object of the present invention to provide such a blow molding apparatus wherein actuation of relative movement of mold sections to produce the compression areas is simplified over conventional molding apparatus and, in particular, to accomplish multi-stage movement of mold sections from a single actuating device.

Briefly summarized, the blow molding apparatus of the present invention basically comprises a mold which defines a mold cavity for receiving a plastic parison for blow molding into conformity with the mold cavity. According to the present invention, the mold has at least three mold sections longitudinally arranged in end-to-end relation to one another. A guide arrangement connects the mold sections for longitudinal movement toward and away from one another, the guide arrangement including a stop arrangement for defining predetermined spacings between the mold sections when they are moved away from one another. An actuating arrangement is connected with an endwise one of the mold sections for selectively moving such mold section toward the other mold sections to move the mold sections into abutting relationship and for selectively moving the endwise mold section away from the other mold sections to separate them from one another by their aforesaid predetermined spacings. A control system operates the actuating arrangement to move the mold sections into abutting relationship after a parison has been blow molded into conformity with the mold cavity to compress the parison between the mold sections, thereby forming a pair of compression molded areas longitudinally spaced by the intermediate one of the mold sections.

In the preferred embodiment, the mold includes a pair of mold assemblies which cooperate to define the mold cavity and which are movable toward and away from one another to enclose and open the mold cavity, each mold assembly including the three mold sections, the guide arrangement, and the actuating arrangement. In each mold assembly, the endwise mold section opposite the first-mentioned endwise mold section associated with the actuating arrangement is mounted in a stationary disposition.

Preferably, the guide arrangement includes a first guide rod extending through the first-mentioned endwise mold section and the intermediate mold section, and a second guide rod extending through the intermediate mold section and the opposite endwise mold section. The stop arrangement includes stop members mounted at opposite ends of each guide rod. Each guide rod is selected to be of an effective length between its end stop members exceeding the combined dimension of the mold sections through which the guide rod extends by a dimension equivalent to the predetermined spacing between the respective mold sections. The actuating arrangement preferably is an extensible and retractable piston connected to the associated endwise mold section.

Thus, the guide arrangement serves to cause the mold sections to move toward and away from one another in stages. Particularly, upon operation of the actuating arrangement to move the mold sections into abutting relationship, the associated endwise mold section and the intermediate mold section generally move together in advance of the intermediate mold section and the other endwise mold section moving together. Likewise, when the actuating arrangement is operated to separate the mold sections, the associated endwise mold section and the intermediate mold section generally separate from one another in advance of separation of the intermediate mold section and the other endwise mold section.

In one embodiment of the present invention, the mold cavity is configured to form two molded articles in tandem joined by an intermediate waste portion to be removed by subsequent processing to separate the articles from one another. In such embodiment, each article is formed with one compression molded area.

In preferred embodiments of the invention, the mold sections are configured to define the spacings therebetween to extend annularly thereabout for forming the compression molded areas as annular rings.

DESCRIPTION OF THE PREFERRED EMBODIMENT

Figure 1:
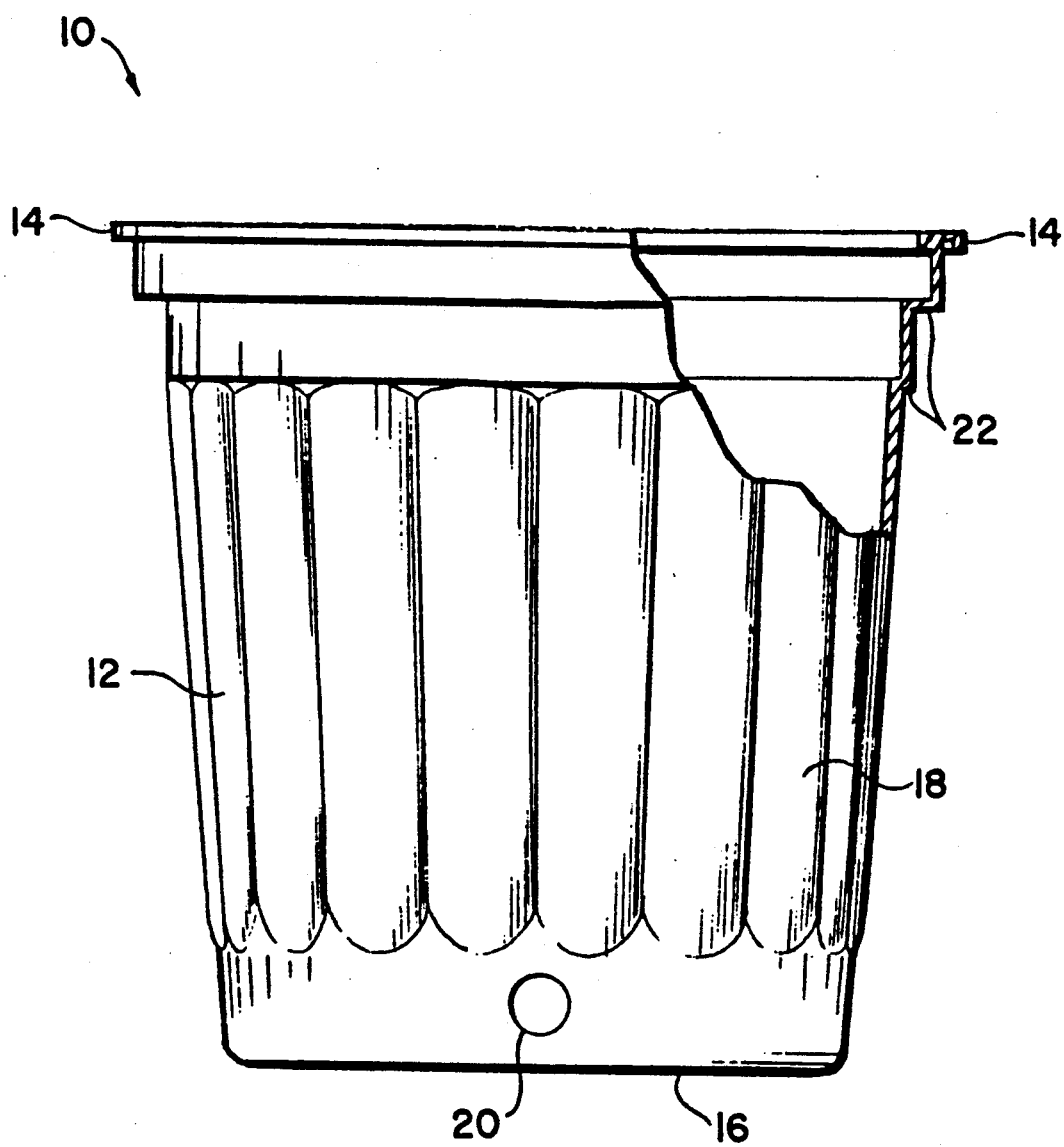
FIG. 1 is a view partially in side elevation and partially in vertical cross-section of a plant container produced by blow molding utilizing an apparatus in accordance with the present invention.

Referring now to the accompanying drawings and initially to FIG. 1, a plant container as produced by blow molding apparatus according to the preferred embodiment of the present invention, as hereinafter more fully described, is indicated generally at 10. Basically, the plant container 10 is integrally molded of a suitable thermoplastic material to have a frusto-conical body 12 terminating at its larger diameter end in an annular rim portion 14 and substantially closed at its smaller diameter end by a generally flat transverse base wall 16. The frusto-conical body 12 of the plant container 10 consists substantially of a plurality of lengthwise-extending concavoconvex ribs 18 which are substantially concave at the inwardly facing wall surface of the body 12 and substantially convex at the outwardly facing wall surface of the body 12. Drainage holes 20 are formed, as desired, in the base wall portion 16 and the adjacent end region of the frusto-conical body 12 subsequent to the molding process. The opposite end of the body 12 is of a stepped configuration formed by a series of undercuts 22, the annular rim portion 14 extending outwardly therefrom. The rim portion 14 is of a generally inverted L-shaped configuration and has a relatively thicker cross-sectional dimension than the other portions of the plant container 10 resulting from the compression molding ability of the present blow molding apparatus as hereinafter described.

Figure 2:
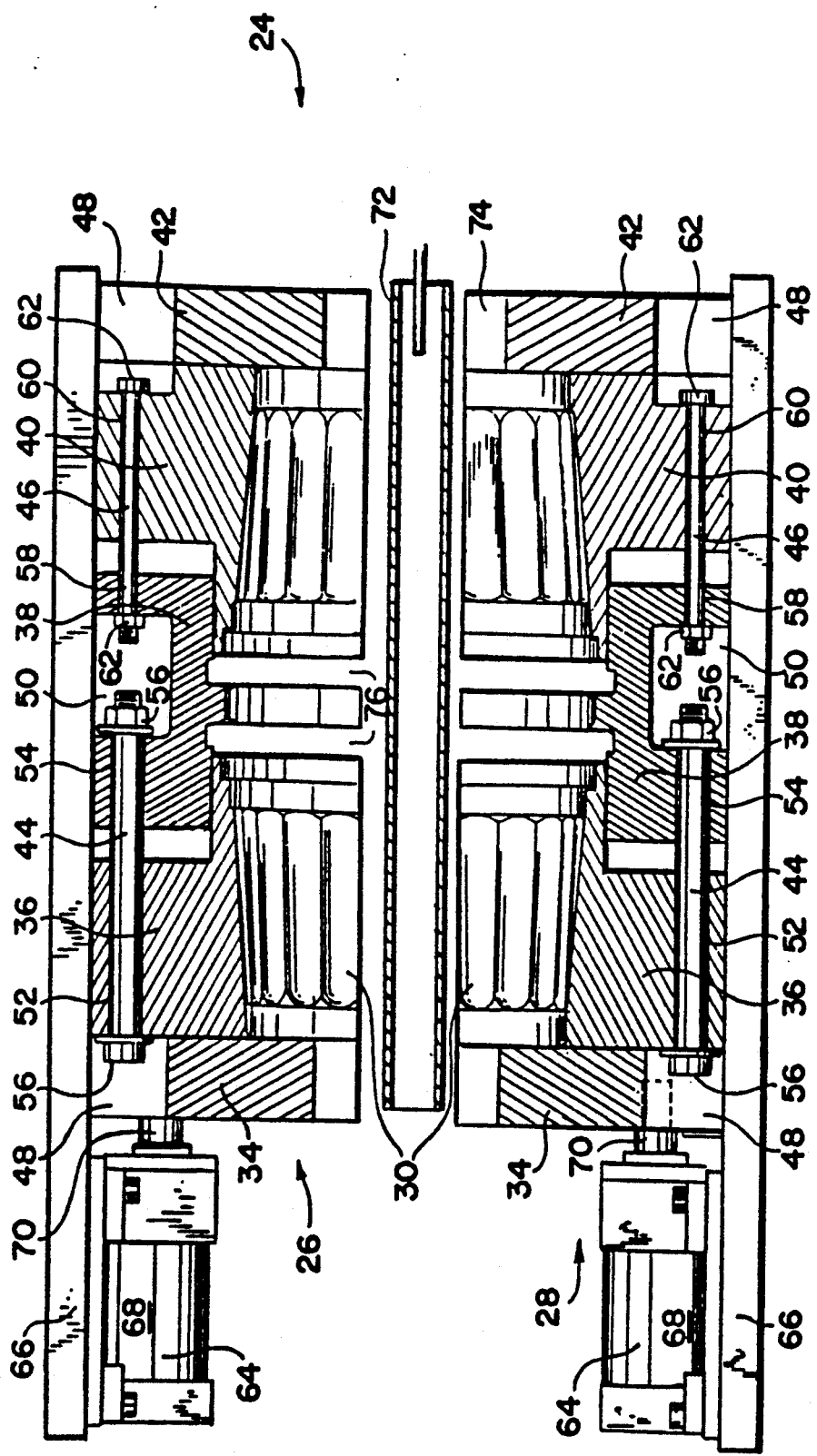
FIG. 2 is a lengthwise cross-sectional view of a blow molding apparatus in accordance with the present invention for producing plant containers of the type illustrated in FIG. 1, the apparatus being illustrated in its open condition.
Figure 3:
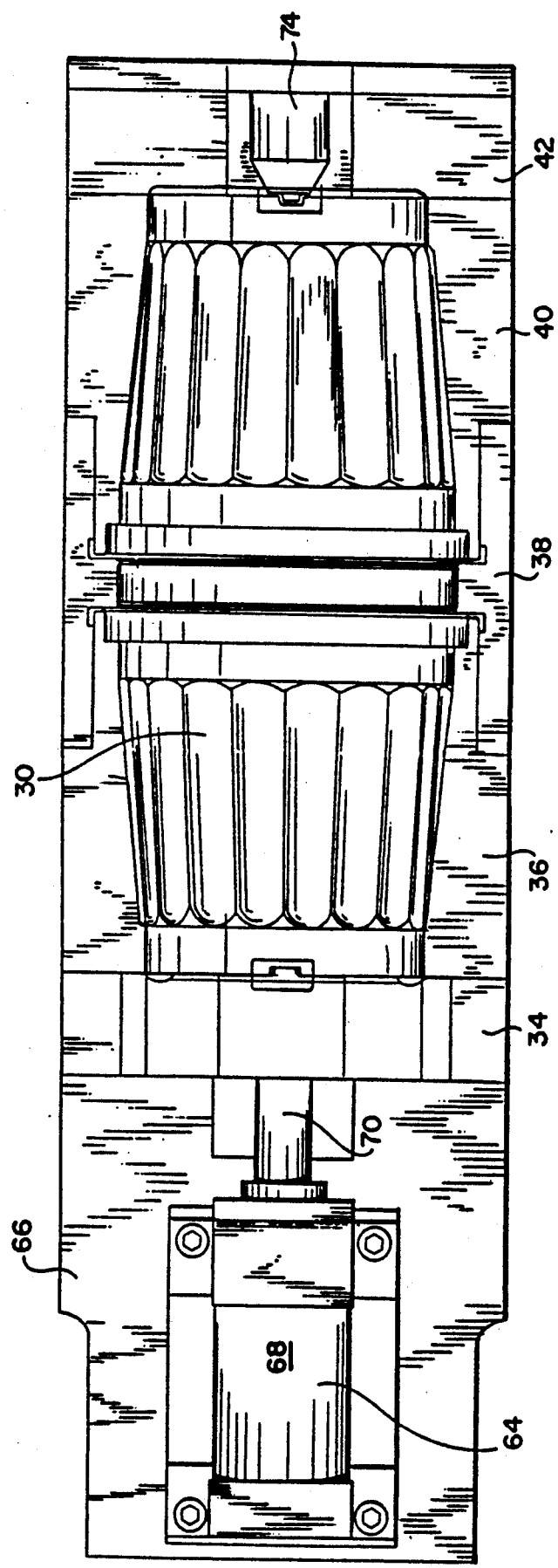
FIG. 3 is a side elevational view of one mold half of the blow molding apparatus of FIG. 2.
Figure 4:
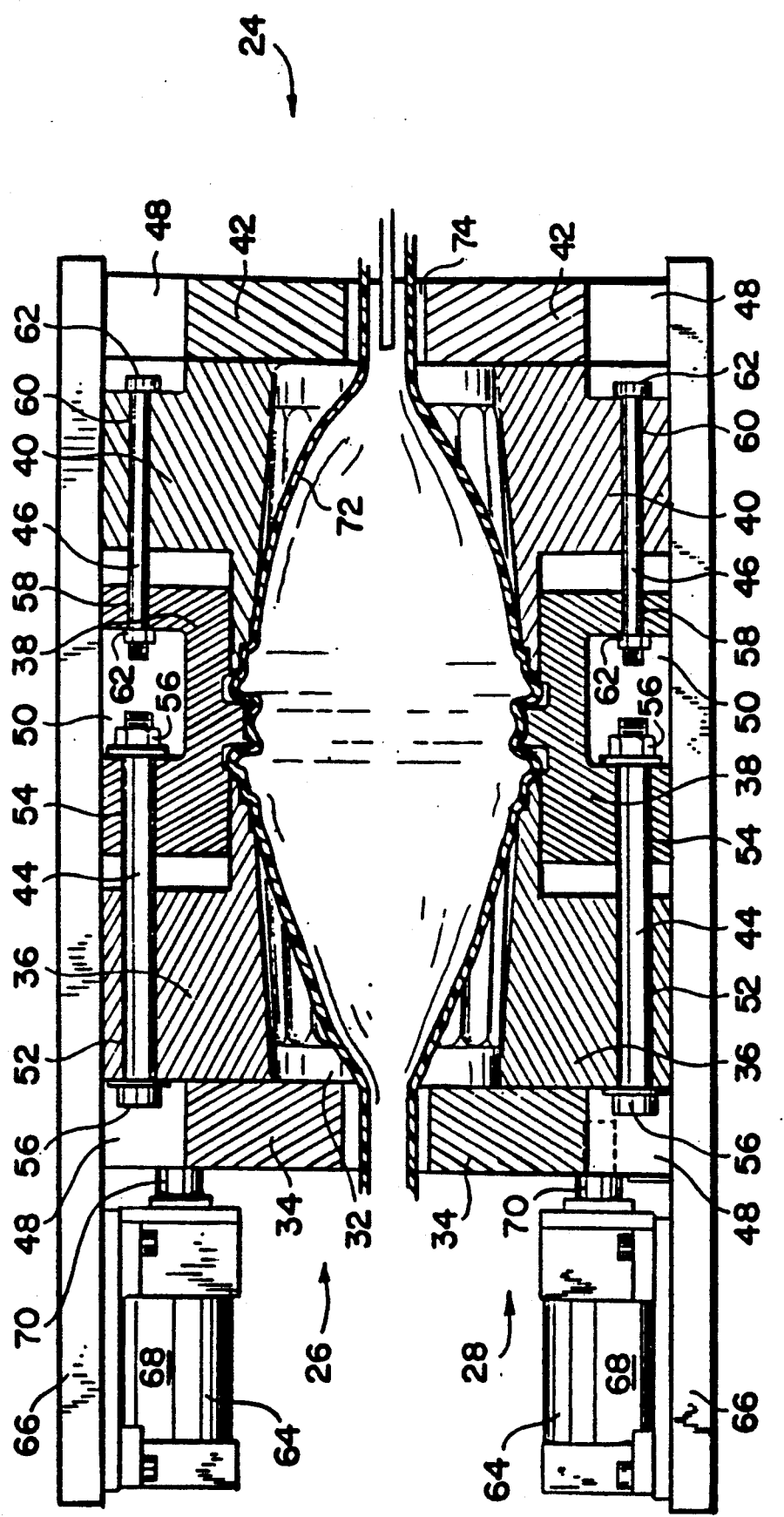
FIGS. 4, 5 and 6 are lengthwise cross-sectional views of the blow molding apparatus of FIG. 2 illustrating the mold halves in their closed condition in sequential stages of closing of the mold sections.
Figure 5:
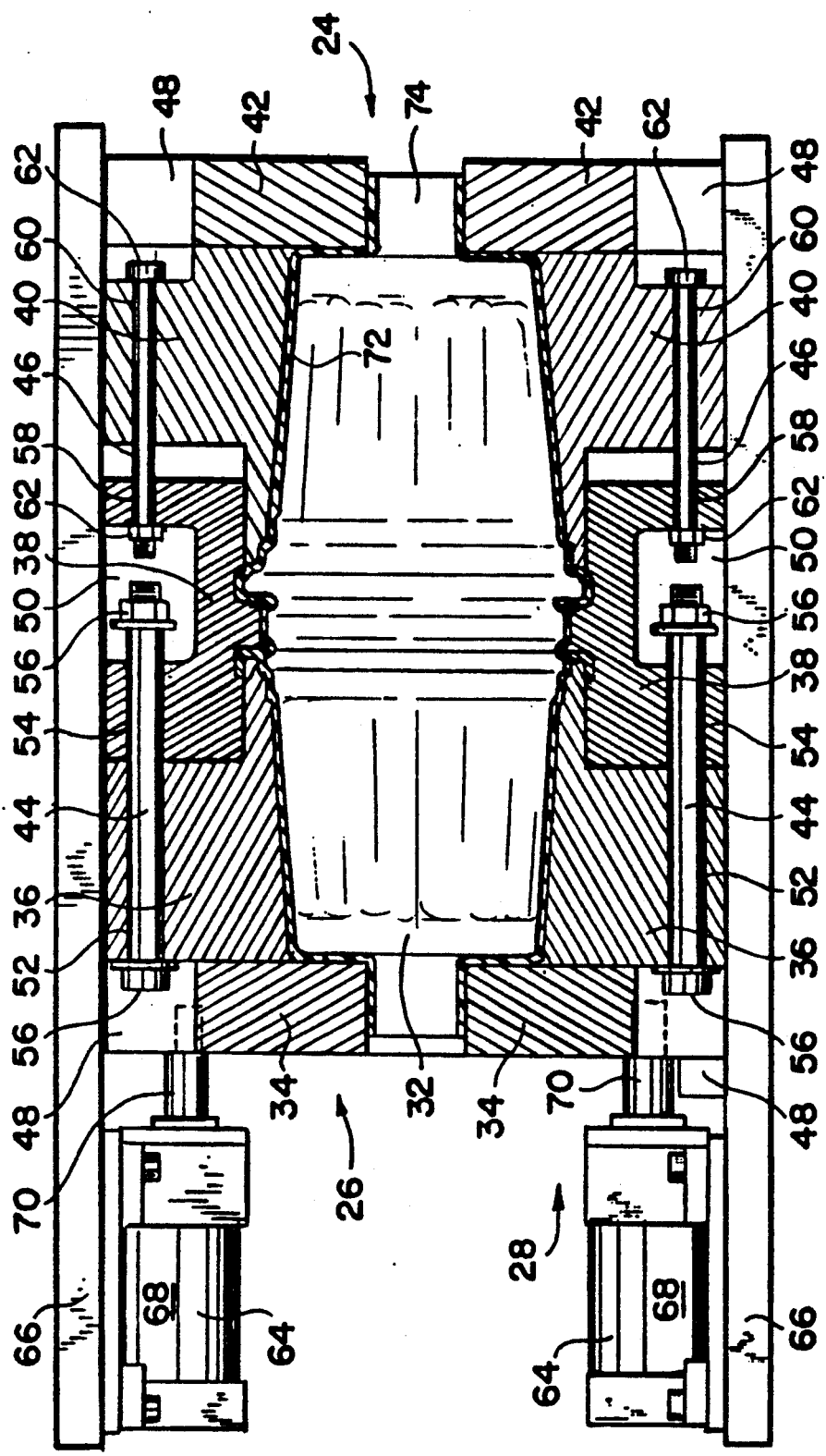
Figure 6:
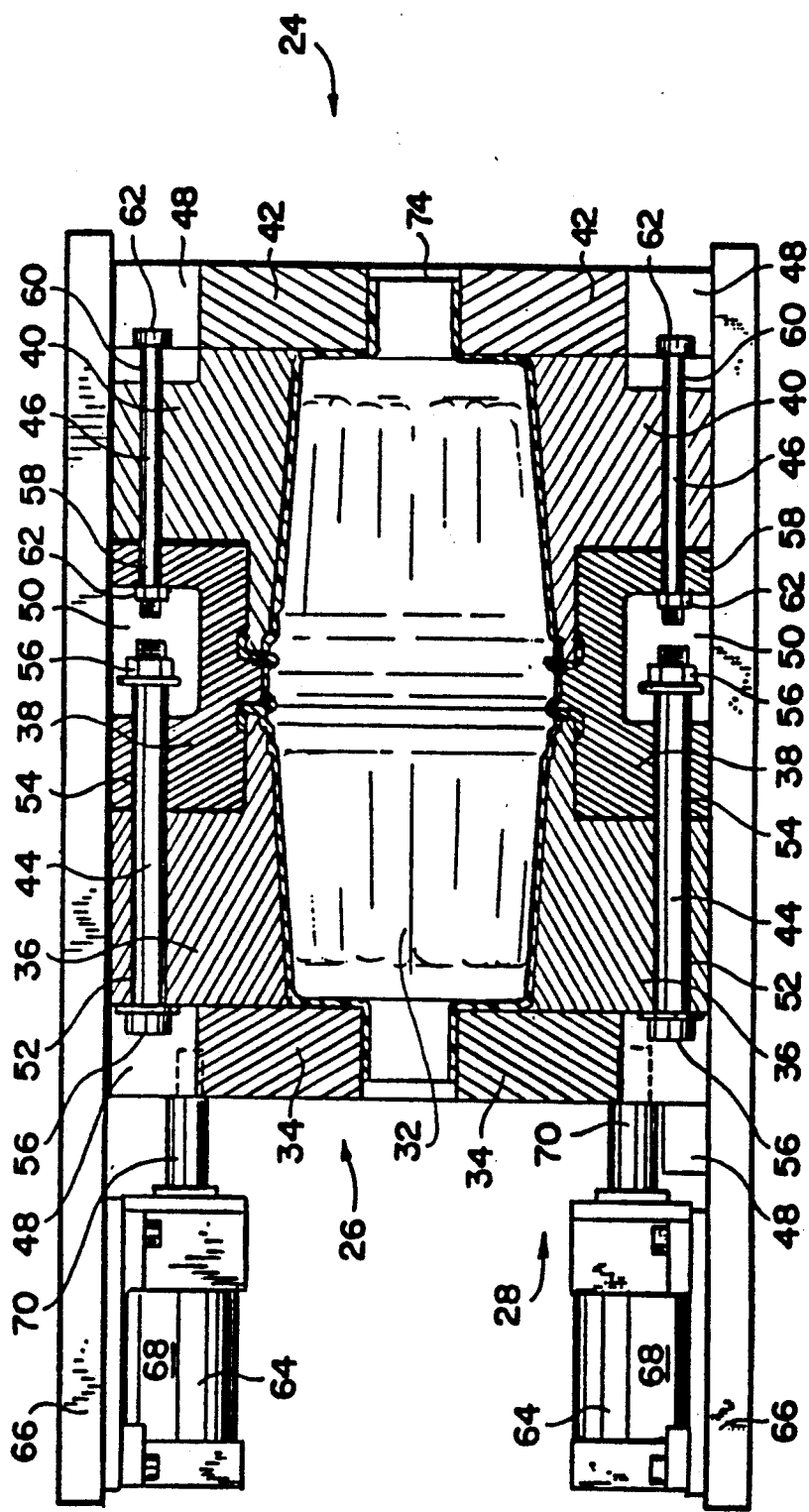

Referring now to FIGS. 2–6, a blow molding apparatus according to the preferred embodiment of the present invention suitable for fabricating the plant container 10, is indicated generally at 24. Basically, the blow molding apparatus 24 includes two mold halves 26,28, each consisting of an assembly of plural mold sections arranged in end-to-end relationship with one another. The mold sections of each mold half 26,28 are profiled at the surfaces thereof facing the other mold half 28,26 to cooperatively define a mold recess 30. In conventional fashion, the mold halves 26,28 are supported for selective movement toward and away from one another between an opened position wherein the mold halves 26,28 are separated in spaced facing relationship, as illustrated in FIG. 2, and a closed molding position wherein the mold halves 26,28 are brought together with their respective facing surfaces in abutting contact such that their respective recesses 30 cooperatively define a substantially enclosed mold cavity 32, as illustrated in FIGS. 4–6.

The present invention contemplates the simultaneous molding in the blow molding apparatus 24 of two of the plant containers 10 in tandem coaxial mirror-image relation with their respective rim portions 14 in juxtaposed facing relation. For this reason, and because each plant container 10 is of a symmetrical configuration, the mold halves 26,28 are of substantially identical mirror-image configuration with each mold half 26,28 being of a substantially symmetrical end-to-end configuration. Accordingly, each mold half 26,28 basically includes five mold sections 34,36,38,40,42, arranged end-to-end along the length of their respective mold half 26,28. In each mold half 26,28, the mold sections 34,42 are of substantially corresponding configuration profiled in accordance with the desired configuration of one-half of the base wall portion 16 of the plant container 10, the mold sections 34,42 being arranged at opposite ends of the mold half in mirror-image relationship. Similarly, the mold sections 36,40 in each mold half 26,28 are profiled in accordance with the desired configuration of one-half of the frusto-conical body 12 and the underside of the rim portion 14 of the plant container 10, the mold sections 36,40 being arranged in mirror-image relation to one another respectively adjacent the end mold sections 34,42. The remaining intermediate mold section 38 of each mold half 26,28 is disposed between its mold sections 36,40 and is configured to cooperate with the mold sections 36,40 to define the desired outward configuration of one-half of the rim portion 14 of the plant container 10.

In each mold half 26,28, the respective mold sections 34,36,38,40,42 are connected with one another in the described end-to-end relationship by an arrangement of guide rods 44,46 which facilitate a limited predetermined amount of longitudinal movement of the mold sections toward and away from one another. Specifically, in each mold half 26,28, the mold sections 34,36 are rigidly connected to one another and, likewise, the mold sections 40,42 are rigidly connected to one another. Each of the mold sections 34,42 has a longitudinally extending recess 48 formed along its outwardly exposed peripheral surface and, likewise, the mold section 38 is centrally formed with a longitudinally extending recess 50, the respective recesses 48,50 in the mold sections 34,38,42 being aligned with one another. The guide rod 44 extends slidably through bores 52,54 formed longitudinally through the mold sections 36,38 in alignment with one another and with the recesses 48,50. The guide rod 44 is of a sufficient lengthwise dimension such that each end of the guide rod 44 extends outwardly beyond the mold sections 36,38. Each end of the guide rod 44 carries an enlarged head portion 56 arranged such that the effective lengthwise dimension of the guide rod 44 between the opposite head portions 56 exceeds the corresponding intervening lengthwise dimension of the mold sections 36,38 to permit a predetermined corresponding amount of relative movement of the mold sections 34,36 as a unit toward and away from the mold section 38. Likewise, the guide rod 46 extends slidably through bores 58,60 formed longitudinally through the mold sections 38,40 in alignment with one another and with the recessed areas 48,50, the opposite ends of the guide rod 46 extending outwardly beyond opposite ends of the mold sections 38,40 and carrying enlarged head portions 62 spaced from one another by a dimension exceeding the corresponding intervening lengthwise dimension of the mold sections 38,40 to permit a corresponding limited predetermined amount of relative movement of the mold section 38 toward and away from the unitary mold sections 40,42.

In this manner, the mold sections 34-42 of each mold half 26,28 may be selectively moved relative to one another between an open condition wherein each of the mold sections 36,40 are separated from the intervening mold section 38, as illustrated in FIGS. 2 and 4, and a closed condition wherein the mold sections 36,38,40 are brought together in end-to-end abutment, as illustrated in FIG. 6. Actuation of such relative movement of the mold sections 34-42 of the mold halves 26,28 is provided by a pair of hydraulic piston-and-cylinder assemblies 64, or another suitable linear actuators, respectively associated with the two mold halves 26,28. Specifically, each mold half 26,28 includes a base 66 to which the mold sections 40,42 are stationarily affixed and along which the other mold sections 34,36,38 are longitudinally movable to the extent permitted by the arrangement of guide rods 44,46. The cylinder housing 68 of the associated piston-and-cylinder assembly 64 is rigidly mounted to the base 66 adjacent the end mold section 34 in a disposition for linear movement of the piston 70 in parallel relation to the linear direction of permissible movement of the mold sections 34-42 as defined by the guide rods 44,46. The extending end of each piston 70 is affixed to the respective mold section 34 of the associated mold half 26,28, thereby to actuate relative opening and closing movement of the mold sections 34-42.

It will thus be understood that the piston-and-cylinder assemblies 64 actuate opening and closing movement of the mold sections 34-42 in stages. Specifically, from the fully open condition of the mold sections shown in FIGS. 2 and 4, actuation of the piston-and-cylinder assemblies 64 to close the mold sections initially acts on the endwise unit of mold sections 34,36 to close the spacing between the mold section 36 and the intermediate mold section 38 generally without closing the spacing between the mold sections 38 and 40, as illustrated in FIG. 5, after which the piston-and-cylinder assemblies 64 act through the closed mold sections 34,36,38 to close the spacing between the mold sections 38 and 40 to achieve the fully-closed condition of FIG. 6. Subsequent retraction of the piston-and-cylinder assemblies 64 effects re-opening of the mold sections in a corresponding reverse sequence of stages.

The operation of the present molding apparatus 24 may thus be understood with reference to the sequence of FIGS. 2,4,5 and 6. Initially, the mold halves 26,28 are separated from one another with their respective piston-and-cylinder assemblies 64 fully retracted to separate their respective mold sections 34-42 from one another in their fully-opened condition, as shown in FIG. 2. A compounding plastic extruder (not shown) extrudes a molten hollow plastic tube 72, commonly referred to as a parison, from a location adjacent and centrally with respect to the facing mold sections 42 axially into the area between the facing mold halves 26,28. The mold halves 26,28 are then brought together into surface abutment to capture the molten plastic parison 72 within the mold cavity 32 cooperatively defined between the abutting mold halves 26,28. Simultaneously, pressurized air is directed into the hollow center of the molten plastic parison 72 through an air channel 74 defined between the abutting endwise mold sections 42 of the mold halves 26,28 to cause the parison 72 to expand uniformly into conformity with the configuration of the mold cavity 32, as illustrated in FIG. 4. After a predetermined delay following closure of the mold halves 26,28 and inflation of the parison 72 sufficient to permit the parison 72 to expand into the annular spacings 76 between the intermediate mold sections 38 and the adjacent mold sections 36, 40, the piston-and-cylinder assemblies 64 are actuated by the control unit (not shown) of the blow molding apparatus 24 to extend their respective pistons 70 simultaneously to move the mold sections 34-42 in stages, as aforedescribed, from their fully open condition (FIG. 4) through their intermediate partially closed condition (FIG. 5) to their fully closed condition (FIG. 6). In doing so, the portions of the expanded parison 72 which have entered the annular spacings 76 between the mold sections 36, 38, 40 are captured and compressed, thereby compression molding the captured plastic material in the desired configuration of the rim portion 14. As will be understood, the compression-molded rim portions 14 are essentially formed of a dual thickness of the plastic material in comparison to the remaining portions of the molded article so as to have a substantially thicker cross-section.

Figure 7:
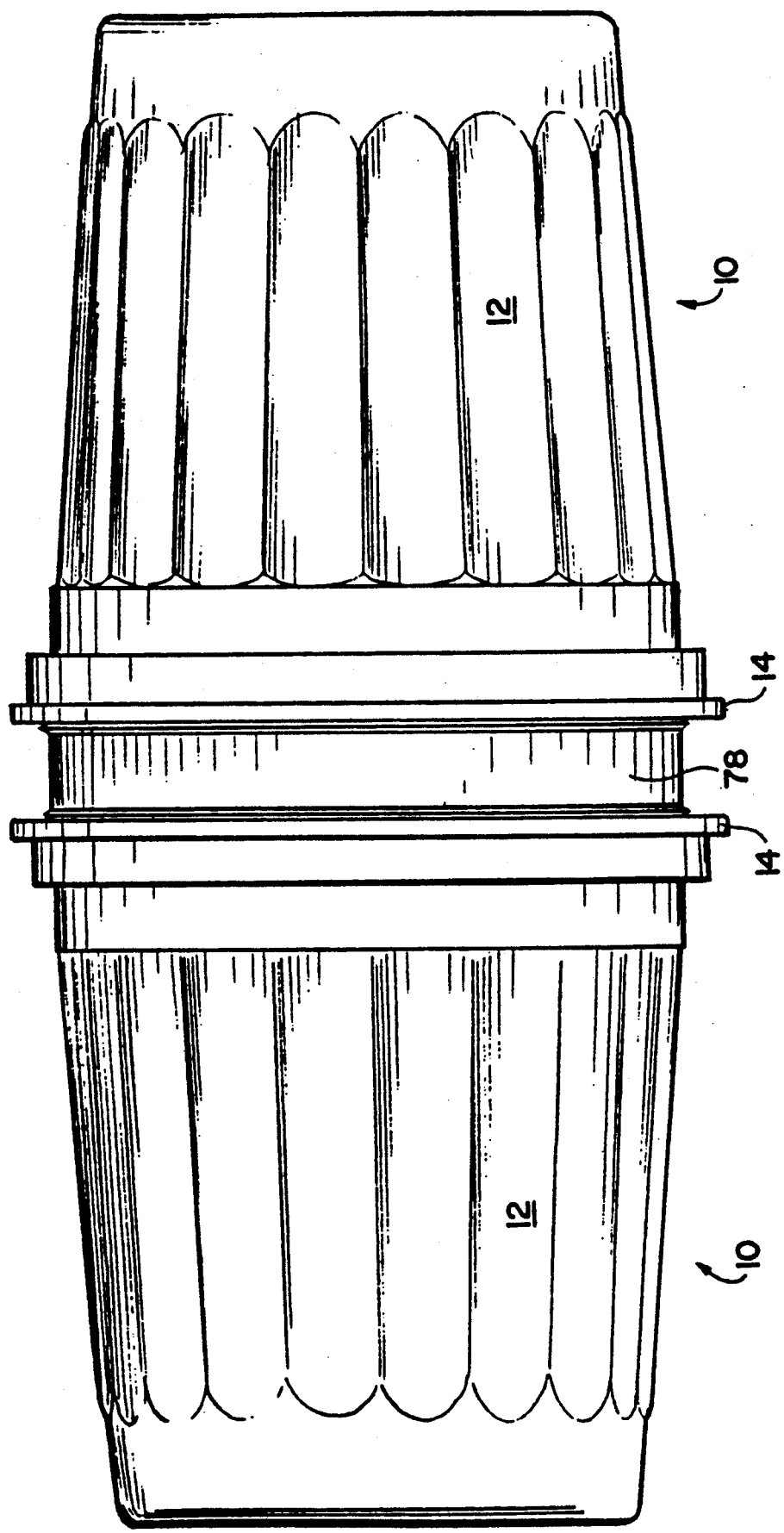
FIG. 7 is a side elevational view of the molded article, comprising a pair of the plant containers of FIG. 1 molded in tandem, as produced by the blow molding apparatus of FIGS. 2–6.

After sufficient time to permit the plastic material to cure in the molded configuration conforming to the interior configuration of the mold cavity 32, the piston-and-cylinder assemblies 64 are retracted to separate the mold sections 34-42 and the mold halves 26,28 are separated from one another to release the molded article, which is illustrated in FIG. 7. As will be recognized, the molded article consists of two of the plant containers 10 axially aligned in mirror-image relation with their respective rim portions 14 adjacent on another and their respective base wall portions 16 spaced away from one another. The adjacent rim portions 14 of the two plant containers 10 are connected by an intervening annular connecting portion 78 molded in conformity to the molding surfaces of the intermediate mold sections 38. Following removal of the tandem plant containers 10 from the molding apparatus 24, the connecting portion 78 is cut closely adjacent each rim portion 14 to separate the two plant containers 10. The connecting portion 78 is then discarded as waste.

Advantageously, the blow molding apparatus 24 of the present invention enables two or more separate compression rings or other compression molded areas to be formed in a single molding operation without the conventional practice of utilizing separate piston-and-cylinder assemblies or other actuating mechanisms to accomplish the formation of each compression molded area. By the arrangement of the guide rods 44,46, multiple mold sections of each mold half can be reliably opened and closed in a multi-stage sequence of movements utilizing a single set of actuating piston-and-cylinder assemblies, which provides simplified operation and an economical use of the space required for the molding apparatus.

Figure 8:
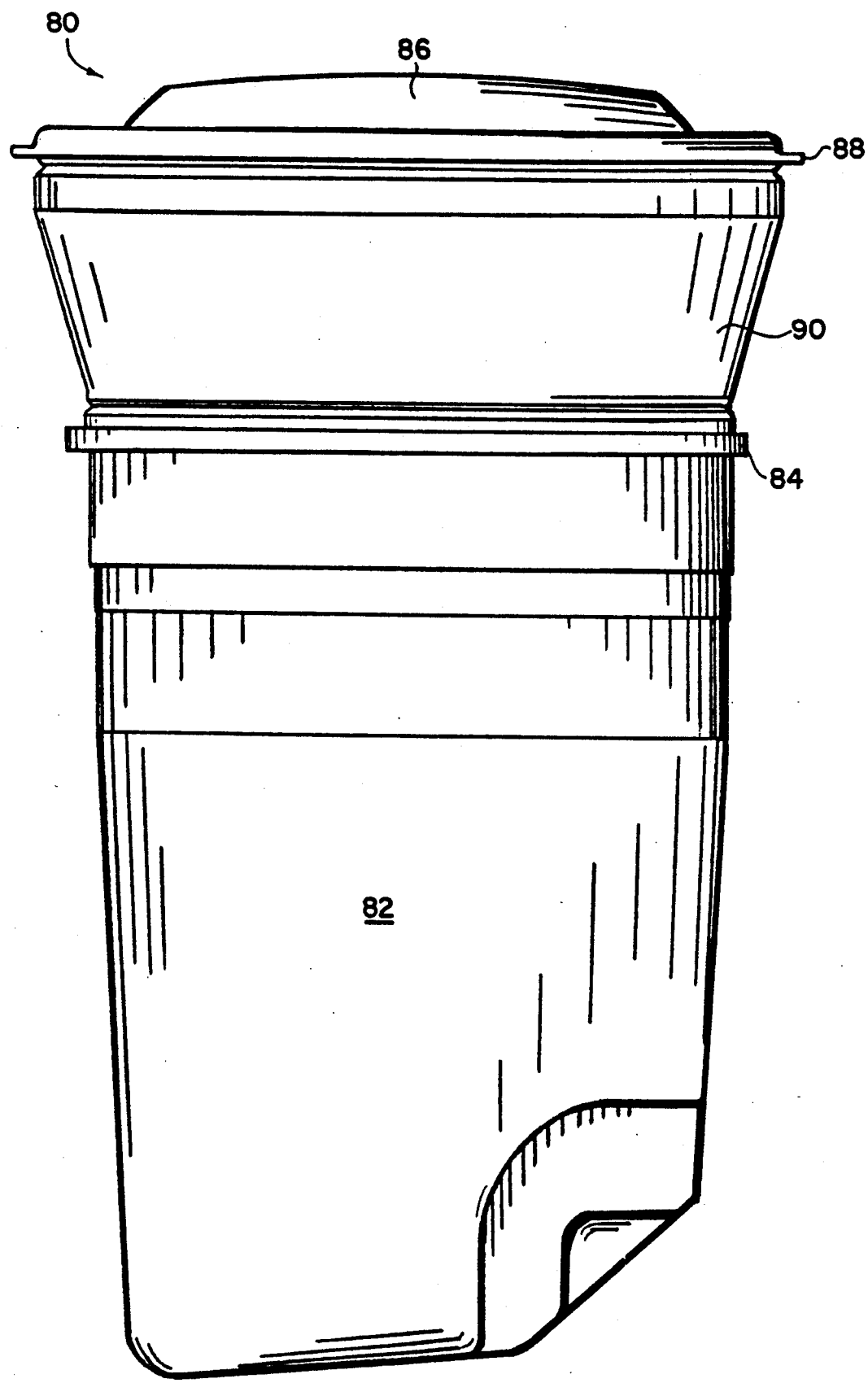
FIG. 8 is a side elevational view of another molded article, comprising a trash container and a lid therefor molded in tandem, as produced by another embodiment of the present blow molding apparatus.

While the present blow molding apparatus has been herein described and illustrated in one preferred embodiment for the tandem fabrication of identical plant containers, it will be readily apparent to those persons skilled in the art that the present invention is equally well adapted for accomplishing substantially any other blow molding operation wherein two or more spaced compression rings or other compression molded areas are to be formed as part of the molding operation. For example, molding apparatus of the present invention would be suitable for various other blow molding operations for tandem formation of separate molded articles, whether or not the articles are to be of identical configuration. For example, FIG. 8 illustrates a tandem molded article, generally indicated at 80, consisting of a trash container 82 having a compression molded rim portion 84 at its upper end, which is to be open in ordinary use, and a container lid 86 having a compression molded rim portion 88, configured to fit the rim portion 84 of the container 82 in normal use to cover the open top of the container, with an annular connecting portion 90 extending between the two rim portions 84,88 to be severed therefrom and discarded subsequent to the molding operation. Another possible use of the present invention could be to compression-form a handle portion for a container unitarily with the blow molding of the container body itself.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for blow molding an article having a pair of longitudinally spaced compression molded areas, said apparatus comprising a mold defining a mold cavity for receiving a plastic parison for blow molding into conformity with said mold cavity, said mold having at least three mold sections longitudinally arranged end to end relative to one another, guide means comprising at least one guide rod connecting said mold sections for longitudinal movement toward and away from one another, said guide means comprising stop means for defining predetermined spacings between said mold sections when moved away from one another, said stop means comprising stop members on said guide rode, and actuating means connected with an endwise one of said mold sections for selectively moving said one mold section toward the other said mold sections to move said mold sections into abutting relationship and for selectively moving said one mold section away from the other said mold sections to separate them from one another by said predetermined spacings, and control means for operating said actuating means to move said mold sections into abutting relationship after blow molding of a parison into conformity with said mold cavity to compress the parison between said mold sections, thereby forming a pair of compression molded areas longitudinally spaced by the intermediate one of said mold sections.

2. Blow molding apparatus according to claim 1 wherein said mold comprises a pair of mold assemblies which cooperate to define said mold cavity and which are movable toward and away from one another to enclose and open said mold cavity, each said mold assembly including said three mold sections, said guide means, and said actuating means.

3. Blow molding apparatus according to claim 1 wherein the endwise one of said mold sections opposite said one mold section is mounted in a stationary disposition.

4. Blow molding apparatus according to claim 1 wherein said guide means comprises a first guide rod extending through said one mold section and the intermediate one of said mold sections, and a second guide rod extending through said intermediate mold section and the endwise one of said mold sections opposite said one mold section.

5. Blow molding apparatus according to claim 4 wherein said stop means comprises stop members at opposite ends of each said guide rod.

6. Blow molding apparatus according to claim 5 wherein each said guide rod is of an effective length between its end stop members exceeding the combined dimension of said mold sections through which said guide rod extends by a dimension equivalent to the predetermined spacing therebetween.

7. Blow molding apparatus according to claim 1 wherein said actuating means comprises an extensible and retractable piston connected to said one mold section.

8. Blow molding apparatus according to claim 1 wherein said mold cavity is configured to form two molded articles in tandem joined by an intermediate waste portion to be removed by subsequent processing to separate said articles from one another, each said article being formed with one compression molded area.

9. Blow molding apparatus according to claim 1 wherein said mold sections are configured to define said spacings therebetween to extend annularly thereabout for forming the compression molded areas as annular rings.

10. Blow molding apparatus according to claim 1 wherein said guide means is arranged to cause said mold sections to move toward and away from one another in stages wherein said one mold section and the intermediate mold section generally move together and separate from one another in advance of the intermediate mold section and the other endwise mold section moving together and separating from one another.

* * * * *

UNITED STATES PATENT AND TRADEMARK OFFICE
CERTIFICATE OF CORRECTION

PATENT NO.   :   5,026,268

DATED        :   June 25, 1991

INVENTOR(S)  :   Norman C. Lee

It is certified that error appears in the above-identified patent and that said Letters Patent is hereby corrected as shown below:

Column 6, Line 29, reads "on" but should read -- one --.

Column 7, Line 47, reads "rode" but should read -- rod --.

Signed and Sealed this

Twenty-second Day of December, 1992

*Attest:*

DOUGLAS B. COMER

*Attesting Officer*     Acting Commissioner of Patents and Trademarks